(12) United States Patent
Toko

(10) Patent No.: US 9,971,224 B2
(45) Date of Patent: May 15, 2018

(54) ELECTRO-OPTICAL DEVICE

(71) Applicant: STANLEY ELECTRIC CO., LTD., Meguro-ku, Tokyo (JP)

(72) Inventor: Yasuo Toko, Tokyo (JP)

(73) Assignee: STANLEY ELECTRIC CO., LTD., Tokyo (JP)

( * ) Notice: Subject to any disclaimer, the term of this patent is extended or adjusted under 35 U.S.C. 154(b) by 0 days. days.

(21) Appl. No.: 15/332,217

(22) Filed: Oct. 24, 2016

(65) Prior Publication Data

US 2017/0146883 A1   May 25, 2017

(30) Foreign Application Priority Data

Nov. 24, 2015  (JP) .................................. 2015-228580

(51) Int. Cl.
   *G02F 1/155*    (2006.01)
   *G02F 1/163*    (2006.01)
   *G02F 1/1362*   (2006.01)
   *G02F 1/15*     (2006.01)
   *G09G 3/38*     (2006.01)

(52) U.S. Cl.
   CPC ........ *G02F 1/163* (2013.01); *G02F 1/136204* (2013.01); *G02F 1/155* (2013.01); *G02F 1/1506* (2013.01); *G02F 1/1525* (2013.01); *G09G 3/38* (2013.01); *G09G 2310/0256* (2013.01)

(58) Field of Classification Search
   CPC .. G02F 1/163; G02F 1/1506; G02F 1/136204; G02F 1/155; G02F 1/1525; G02F 1/0322; G02F 1/0136; G09G 3/38; G09G 2310/0256; G09G 2300/023; G02B 27/28; H04N 9/3197

USPC .......................................................... 359/259
See application file for complete search history.

(56) References Cited

U.S. PATENT DOCUMENTS

| 9,188,826 B2 | 11/2015 | Kobayashi et al. | |
| 2006/0097982 A1* | 5/2006 | Arai | G09G 3/38 345/105 |
| 2016/0005375 A1* | 1/2016 | Naijo | G09G 3/38 345/690 |

FOREIGN PATENT DOCUMENTS

WO   2012118188 A2   9/2012

* cited by examiner

*Primary Examiner* — Bumsuk Won
*Assistant Examiner* — Henry Duong
(74) *Attorney, Agent, or Firm* — Holtz, Holtz & Volek PC

(57) ABSTRACT

To prevent damage in an electro-optical device that uses electrochromic material. The device includes electro-optical elements and a driving device that applies a driving voltage to the electro-optical elements. The driving device applies a first DC voltage of a positive polarity that cyclically repeats a first voltage and a second voltage that is lower than the first voltage, or a second DC voltage of a negative polarity that cyclically repeats a third voltage and a fourth voltage that is higher than the third voltage, to the electro-optical elements. According to the driving device, when the first DC voltage is applied to one and the second DC voltage is applied to the other electro-optical elements adjacent in the planar view, the first and the second DC voltages are supplied by time division so that the applied period of the first voltage and the third voltage do not overlap.

16 Claims, 7 Drawing Sheets

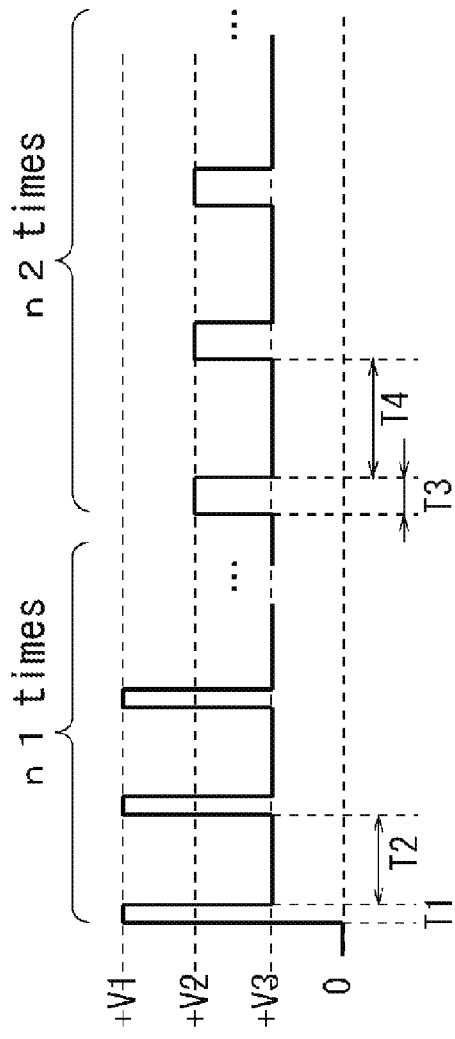
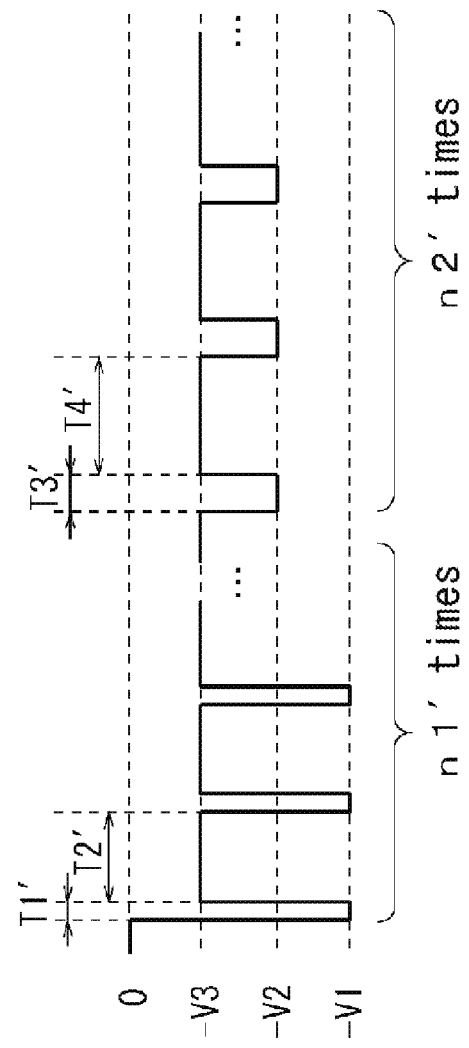
Fig. 6A
Fig. 6B

ELECTRO-OPTICAL DEVICE

BACKGROUND OF THE INVENTION

Field of the Invention

The present invention relates to a driving technique of an electro-optical device configured by using an electrochromic material.

Description of the Background Art

In the international publication WO2012-118188 pamphlet, there is disclosed a light-adjusting element comprising a pair of substrates; a pair of electrodes formed on surfaces of the pair of substrates that face each other, one of the electrodes being a transparent electrode having nano-order depressions and protrusions; and an electrolyte layer that is interposed between the pair of electrodes and includes electrolytes, a mediator, and an electrochromic material that contains silver. When voltage is applied between the pair of electrodes of this light-adjusting element, in one electrode of this light-adjusting element, silver ions in the electrochromic material are reduced and deposited as silver to form a film, and then the deposited silver is dissolved as silver ions when the voltage is released. In this case, if the silver is formed on a smooth electrode, the outer appearance is in a mirror surface state. And if the silver is formed on a particle-modified electrode, the outer appearance is in a dark state (black state) due to irregular reflection of light. Thus, by making one of the pair of electrodes smooth and the other particle-modified, it is possible to switch between the mirror surface state and the dark state according to the polarity of the voltage. Further, when the voltage is released, the area between the substrates becomes transparent (a light-transmitting state).

While the light-adjusting element described above allows switching between the mirror surface state and the dark state according to the polarity of the voltage and thus is unproblematic if used as a singular element, malfunction and damage may occur between adjacent elements when a plurality of these light-adjusting elements is aligned side by side constitute a display device or the like.

For example, assume that voltage (+2.5 V, for example) is applied to one light-adjusting element (here referred to as a "first light-adjusting element" as a matter of convenience) so that the potential of the electrode on one substrate side becomes relatively high to achieve a dark state in outer appearance, and voltage (−2.5 V, for example) is applied to another adjacent light-adjusting element (here referred to as a "second light-adjusting element" as a matter of convenience) so that the potential of the electrode on the other substrate side becomes relatively high to achieve a mirror surface state in outer appearance. In this case, a high voltage (5 V, for example) equivalent to twice the amount of voltage applied to each of the elements is applied between the electrode of the first light-adjusting element and the electrode of the second light-adjusting element on one substrate side. When such a transverse-direction voltage (a horizontal voltage with respect to the substrate surface) occurs, an oxidation-reduction reaction (electro-deposition) occurs in the electrolyte layer that exists between the electrodes, causing malfunction. Specifically, a deposited film of silver or the like occurs between the electrodes and, without sufficient voltage being applied to the first light-adjusting element and the second light-adjusting element, respectively, the reaction in the electrolyte layer is inadequate and the intended operation (a dark state or a mirror surface state) is no longer achieved. Further, an organic solvent of the electrolyte layer has a potential window, and applying a high voltage that exceeds that range is not preferable in terms of element durability. While the time period during which high voltage is applied is preferably short, continually applying voltage for a long period of time (1 second or longer, for example) may damage the organic solvent, resulting in air bubbles and damage to the element.

It is therefore an object of specific aspects according to the present invention to provide a technique that makes it possible to prevent damage and malfunction in an electro-optical device in which a plurality of electro-optical elements (light-adjusting elements) that use an electrochromic material is configured side by side.

SUMMARY OF THE INVENTION

An electro-optical device according to an aspect of the present invention includes a plurality of electro-optical elements provided between a pair of substrates, and a driving device that applies a driving voltage to each of the plurality of electro-optical elements. Each of the plurality of electro-optical elements comprises a first electrode and a second electrode that are disposed facing each other and are connected to the driving device, and a electrolyte layer that contains an electro-deposition material and is disposed between the first electrode and the second electrode. The driving device selectively applies a first DC voltage of a positive polarity that cyclically repeats a first voltage and a second voltage that is lower than the first voltage, or a second DC voltage of a negative polarity that cyclically repeats a third voltage and a fourth voltage that is higher than the third voltage, to each of the plurality of electro-optical elements. According to the driving device, when the first DC voltage is applied to one and the second DC voltage is applied to the other of the electro-optical elements adjacent in the planar view, the first DC voltage and the second DC voltage are supplied by time division so that the applied period of the first voltage and the applied period of the third voltage do not overlap.

According to the configuration described above, it is possible to avoid applying a voltage higher than necessary between adjacent electro-optical elements, and thus prevent damage and malfunction in an electro-optical device in which a plurality of electro-optical elements that use an electrochromic material is configured side by side.

In the electro-optical device described above, a depression and protrusion portion may be provided to a surface of either the first electrode or the second electrode. Further, preferably, the absolute values of the first voltage and the third voltage of the driving voltage are equal. Further, preferably, a repetition frequency of the first voltage and the second voltage of the first DC voltage, and a repetition frequency of the third voltage and the fourth voltage of the second DC voltage are at least 50 Hz each. Further, preferably, the electro-deposition material of the electrolyte layer contains silver.

BRIEF DESCRIPTION OF THE DRAWINGS

FIGS. 6A and 6B are waveform drawings for explaining the driving method of the electro-optical device.

DESCRIPTION OF THE PREFERRED EMBODIMENTS

The following describes embodiments of the present invention with reference to drawings.

Figure 1:
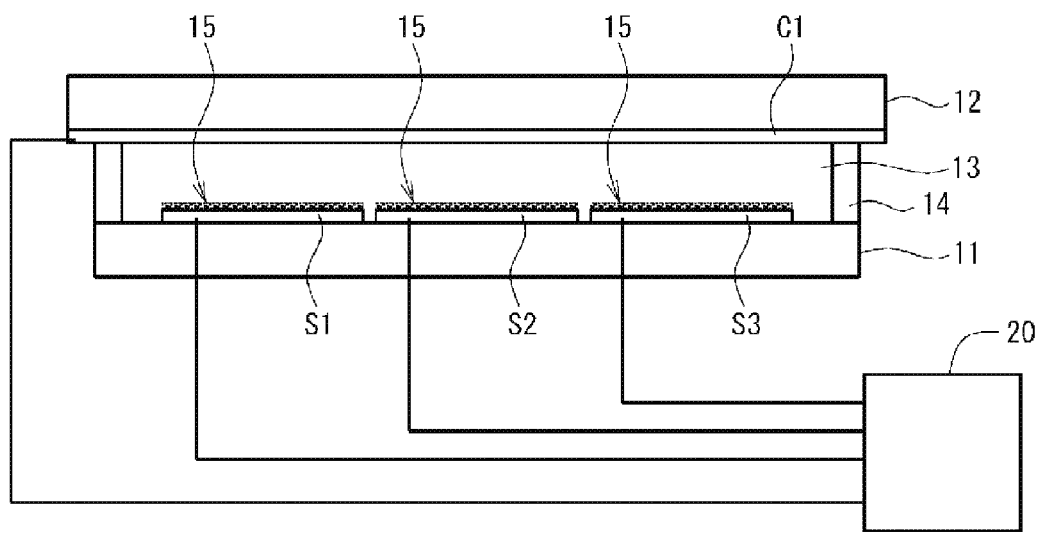
FIG. 1 is a schematic cross-sectional view illustrating a configuration of an electro-optical device of one embodiment.
Figure 2:
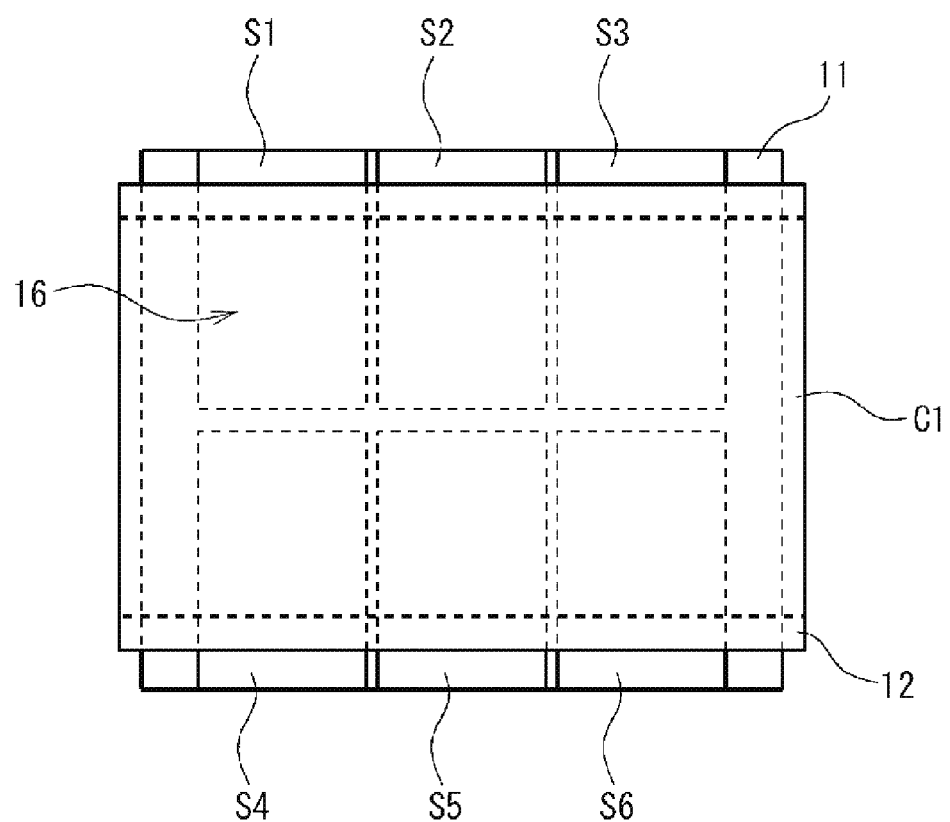
FIG. 2 is a schematic plan view illustrating a configuration of an electro-optical device.

FIG. 1 is a schematic cross-sectional view illustrating a configuration of an electro-optical device of one embodiment. And FIG. 2 is a schematic plan view illustrating a configuration of an electro-optical device. The electro-optical device illustrated in each figure is, for example, a device used for a display application (display device), and is configured to include a first substrate 11, a second substrate 12, an electrolyte layer 13, a sealing material 14, and a driving device 20. A plurality of electrodes (hereinafter referred to as "segment electrodes") S1 to S6 is provided to one side of the first substrate 11. Further, an electrode (hereinafter referred to as "common electrode") C1 is provided to one side of the second substrate 12, extending across substantially the entire surface thereof. The first substrate 11 and the second substrate 12 are disposed so that one side of each faces the other. According to this embodiment, the first substrate 11 is an upper side substrate and the second substrate 12 is a lower side substrate, and the view is from the first substrate 11 side.

The first substrate 11 is a hard substrate (glass substrate, for example) having translucency, for example. The one side of this first substrate 11 is provided with a plurality of segment electrodes S1 and the like. Each of the segment electrodes S1 and the like is configured using a conductive film (indium-tin oxide film, for example) having translucency, for example. As illustrated, a gap (about 100 μm, for example) is provided between each of the segment electrodes S1 to S6, separating the segment electrodes S1 to S6 from each other. In the illustrated example, the segment electrodes S1 to S6 are each formed into a rectangular shape, and are arranged in two rows of three in the left-right direction in FIG. 2. Further, t e surface of each of the segment electrodes S1 to S6 is a substantially flat shape.

The second substrate 12 is a hard substrate (glass substrate, for example) having translucency, for example. The one side of this second substrate 12 is provided with common electrode C1 extending across substantially the entire surface thereof. The common electrode C1 is configured using a conductive film (indium-tin oxide film, for example) having translucency, for example. As illustrated, the common electrode C1 is disposed so as to face each of the plurality of segment electrodes S1 and the like. Each of six regions 16 where the segment electrodes S1 to S6 and the common electrode C1 overlap constitutes an electro-optical element. That is, the electro-optical device of this embodiment comprises six electro-optical elements configured to respectively correspond to the segment electrodes S1 to S6.

The electrolyte layer 13 is configured using an electrolytic solution that contains an electro-deposition material, and is disposed between the respective one sides of the first substrate 11 and the second substrate 12. Specifically, the electrolytic solution that constitutes the electrolyte layer 13 is configured to contain an electrochromic material, a mediator, supporting electrolytes, a solvent, a gelling polymer, and the like. To form the electrolyte layer 13, various known methods can be applied, such as a one drop filling (ODF) method, a dispenser based method, various printing methods such as an inkjet method, a vacuum injection method, or a capillary injection method.

Examples of materials that constitute the electrolyte layer 13 include the use of 50 mM of $AgNO_3$ as an electrochromic agent for the electrochromic material, 10 mM of $CuCl_2$ as a mediator for the mediator, 250 mM of LiBr as the supporting electrolytes for the supporting electrolytes, DMF (N,N-dimethylformamide) for the solvent, and 10 wt % of PVB (vinyl butyral) as a host polymer for the gelling polymer. Note that the gelling polymer may be omitted.

Note that the silver compound is not limited to the above, allowing use of silver chloride, silver oxide, silver bromide, silver iodide, and the like. The concentration of the silver compound is preferably from 5 mM to 500 mM, inclusive, for example, but is not limited thereto.

The supporting electrolytes used are not particularly limited as long as the supporting electrolytes promote an oxidation-reduction reaction of a coloring material, allowing preferred use of a lithium salt (LiCl, LiBr, LiI, $LiBF_4$, $LiClO_4$, or the like), or a sodium salt (NaCl, NaBr, NaI, or the like), for example. The concentration of the supporting electrolytes is preferably from 10 mM to 1 M, inclusive, for example, but is not limited thereto.

The solvent used is not particularly limited as long as the solvent is capable of retaining the coloring material and the like in a stable manner, allowing use of a polar solvent such as water or propylene carbonate, a non-polar organic solvent, an ionic liquid, an ionic conductive polymer, a polyelectrolyte, or the like. Specifically, propylene carbonate, dimethyl sulfoxide, N,N-dimethylformamide, tetrahydrofuran, acetonitrile, polyvinyl sulfate, polystyrene sulfonate, polyacrylic acid, or the like can be used.

The sealing material 14 is provided between the respective one sides of the first substrate 11 and the second substrate 12 so as to surround the regions where the substrates overlap each other, and seals the electrolyte layer 13. Examples of the sealing material 14 that can be used include a UV-curable sealing material, a UV and heat-curable sealing material, and a heat-curable sealing material.

In this embodiment, a gap material (having a 50 μm diameter, for example) is added to the sealing material 14, ensuring a mutual distance (cell thickness) between the first substrate 11 and the second substrate 12. Note that, when substrates having large surface areas are used as the first substrate 11 and the second substrate 12, the gap material is preferably disposed so as to be distributed within the substrate surface to reduce an unevenness of the cell thickness. In this case, the amount distributed on either of the substrates is preferably 1 to 3 pieces/$mm^2$, for example, based on experience, but is not limited thereto. The amount distributed may be in accordance with the required cell thickness, as long as the amount does not readily affect the display quality. Further, the cell thickness may be controlled by a protrusion such as a rib rather than the gap material. A height/width ratio of the protrusion in this case is preferably as high as possible.

A depression and protrusion portion 15 is provided on the surface of each of the segment electrodes S1 and the like. This depression and protrusion portion 15 is formed so as to have minute concave-convex shapes (a non-flat shape) in the order of several tens of nm, for example. Such a depression and protrusion portion 15 can be formed by, for example, spin-coating an indium-tin oxide (ITO) particle dispersion liquid (having a particle size of 100 nm or less, 30 wt %, for example) on the surfaces of the segment electrodes S1 to S6 for 5 seconds at 500 rpm and then 15 seconds at 1500 rpm, and subsequently firing the result for 60 minutes at 250° C.

Note that while the depression and protrusion portion 15 thrilled in a section that serves as a terminal portion for applying voltage from an external source to the segment electrodes is preferably removed by scraping or the like after the first substrate 11 and the second substrate 12 are adhered together, the depression and protrusion portion 15 does not need to be removed. Further, the material used to form the depression and protrusion portion 15 is not limited to ITO, allowing use of a metal oxide film or the like, as long as the material is both conductive and transparent. Further, the method for forming the depression and protrusion portion 15 is not limited to the above.

The driving device 20 is connected with the common electrode C1 and the segment electrodes S1 to S6, and supplies a driving voltage to the electrolyte layer 13 via the common electrode C1 and the segment electrodes S1 to S6. That is, the driving device 20 supplies a driving voltage to the electro-optical elements configured to correspond with the segment electrodes S1 to S6.

Figure 3A:
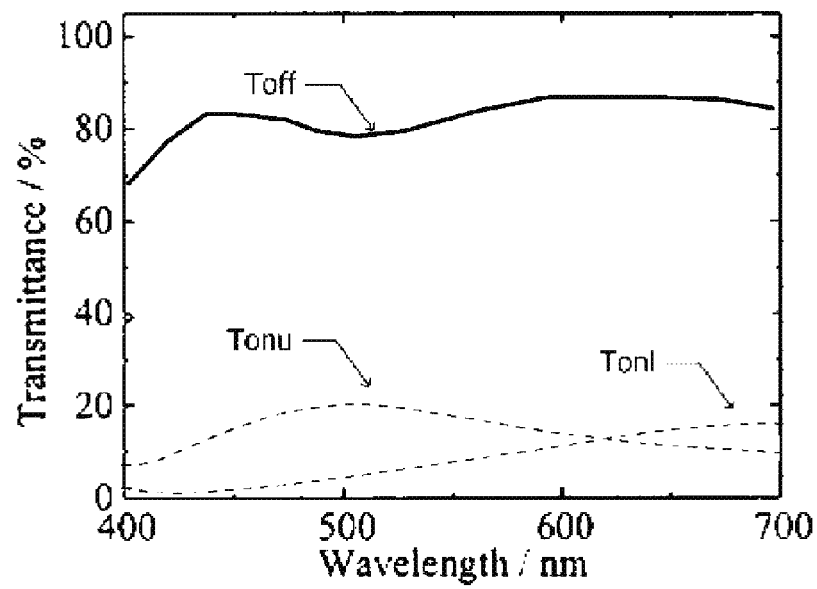
FIG. 3A is a graph showing a light transmission spectrum of the electro-optical device during a steady-state period (when voltage is not applied) and when voltage is applied.
Figure 3B:
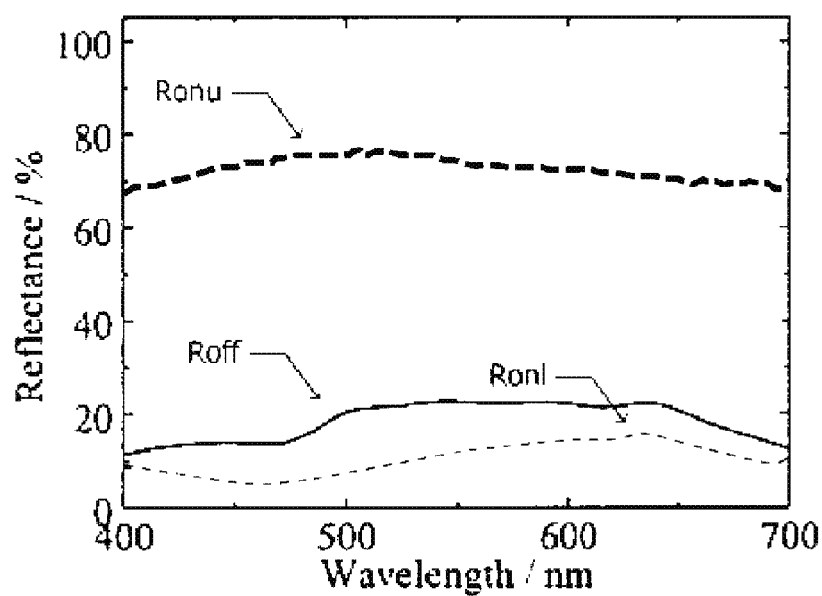
FIG. 3B is a graph showing a light reflection spectrum of the electro-optical device during a steady-state period (when voltage is not applied) and when voltage is applied.

FIG. 3A is a graph showing a light transmission spectrum of the electro-optical device during a steady-state period (when voltage is not applied) and when voltage is applied. And FIG. 3B is a graph showing a light reflection spectrum of the electro-optical device during a steady-state period (when voltage is not applied) and when voltage is applied. In FIGS. 3A and 3B, the wavelength (mm) of the incident light on the electro-optical device is indicated on the horizontal axis, and the transmittance (%) or reflectance (%) with respect to the incident light is indicated on the vertical axis. Here, voltage was suitably applied to one of the electro-optical elements constituted by the segment electrode S1 and the common electrode C1, and optical characteristics thereof were measured.

The spectrum Toff shown in FIG. 3A is the light transmission spectrum during a steady-state period, Tonu is the light transmission spectrum when negative voltage (−2.5 V) is applied to the common electrode C1 with the segment electrode S1 serving as the reference potential (0 V), and Ton1 is the light transmission spectrum when negative voltage (−2.5 V) is applied to the segment electrode S1 with the common electrode C1 serving as the reference potential (0 V). Further, the spectrum Roff shown in FIG. 3B is the light reflection spectrum during a steady-state period, Ronu is the light reflection spectrum when negative voltage (−2.5 V) is applied to the common electrode C1 with the segment electrode S1 serving as the reference potential (0 V), and Ron1 is the light reflection spectrum when negative voltage (−2.5 V) is applied to the segment electrode S1 with the common electrode C1 serving as the reference potential (0 V).

As indicated by the spectrum Toff in FIG. 3A, the light transmittance of the electro-optical element during a steady-state period is extremely high, achieving a high light transmittance state (transparent state). This is because the electrolyte layer 13 is largely transparent. Further, as indicated by the spectrum Ronu in FIG. 3B, when negative voltage is applied to the common electrode C1 with respect to the segment electrode S1, the light reflectance of the electro-optical element becomes extremely high, achieving a high light reflectance state (mirror surface state). This is because the electro-deposition material of the electrolyte layer 13 is deposited on the surface of the relatively flat common electrode C1 as a result of the voltage being applied, and the deposited electro-deposition material becomes a mirror surface state. Note that when the voltage is no longer applied, the electro-deposition material deposited on the electrode surface is once again dissolved into the electrolyte layer 13 and disappears from the surface of the common electrode C1. As a result, the electro-optical element returns once again to a high transmittance state.

Further, as indicated by the spectrum Ton1 in FIG. 3A and the spectrum Ron1 in FIG. 3B, when negative voltage is applied to the segment electrode S1 with respect to the common electrode C1, the light transmittance and the light reflectance of the electro-optical element becomes extremely low, achieving a light absorption state (darkened state). This is because the electro-deposition material contained in the electrolyte layer 13 is deposited on the segment electrode S1 provided with the depression and protrusion portion 15 as a result of the voltage being applied, and plasmon absorption (and irregular reflection) occurs when there is incident light on the deposited electro-deposition material. Note that when the voltage is no longer applied, the electro-deposition material deposited on the electrode surface is once again dissolved into the electrolyte layer 13 and disappears from the surface of the segment electrode S1. As a result, the electro-optical element returns once again to a high transmittance state.

As described above, when the electro-deposition material is deposited on a flat surface (the surface of the common electrode C1), the region where the electro-deposition material is deposited becomes a mirror surface region and, when the electro-deposition material is deposited on an irregular surface (the surface of the segment electrode S1), the region where the electro-deposition material is deposited becomes a dark region. The electro-optical element is capable of achieving at least the following three states, the transparent state (light transmittance state), the mirror surface state (light reflectance state), and the dark state (light absorption state). However, while it is easy to switch between the three states when DC voltage is simply applied as described here, it is difficult to achieve a mixture of the mirror surface state and the darkened state simultaneously and thus to normally operate a plurality of electro-optical elements (picture elements) configured in correspondence with the arrangement of the segment electrodes S1 to S6. To achieve this, the driving method described below is preferably used.

Figures 4A, 4B:
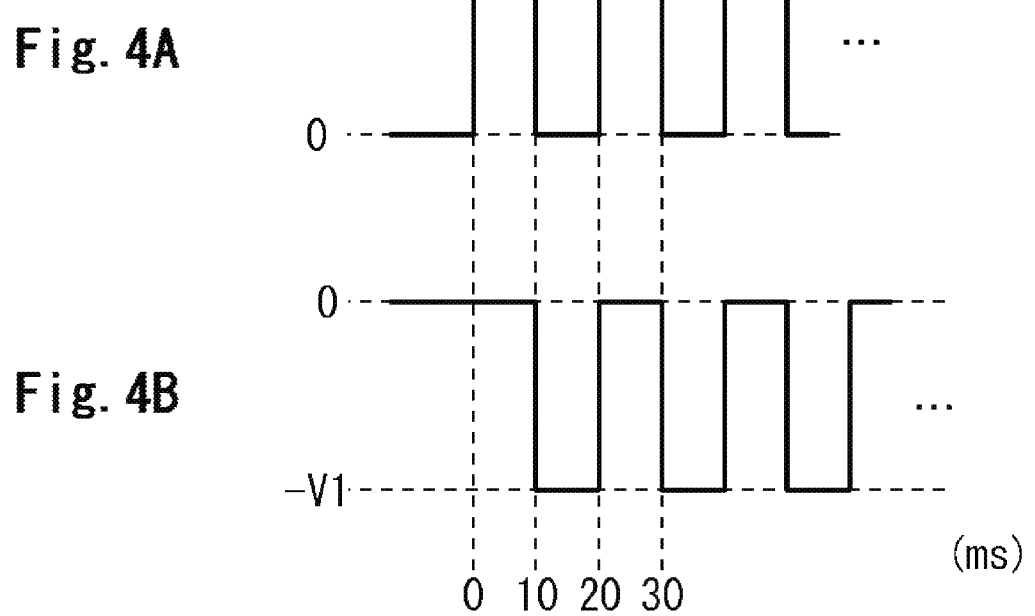
FIGS. 4A and 4B are waveform drawings for explaining the driving method of the electro-optical device.

FIGS. 4A and 4B are waveform drawings for explaining the driving method of the electro-optical device. In this embodiment, the electro-optical device is driven by the driving device 20 using a polarity inversion signal (DC) that is time-division multiplexed with respect to adjacent electro-optical elements, thereby ensuring that high voltage is not applied between adjacent electro-optical elements.

For example, a reference potential (0 V here) is applied to the common electrode C1 and the segment electrodes S1, S3, a rectangular wave (refer to FIG. 4A) that repeats the reference potential and +V1 (+2.8 V as an example) at a frequency of 50 Hz or greater at a constant cycle is applied to the segment electrodes S5, S6, and a rectangular wave (refer to FIG. 4B) that cyclically repeats the reference potential and −V1 (−2.8 V as an example) at a frequency of 50 Hz at a constant cycle is applied to the segment electrodes S2, S4. As illustrated, the rectangular wave in FIG. 4A and the rectangular wave in FIG. 4B are established so that the respective timings at which the absolute values thereof become higher than the reference potential deviate from each other by a half cycle, and do not overlap. That is, during the period in which the potential of the rectangular wave in FIG. 4A is +V1, the rectangular wave in FIG. 4B exhibits the reference potential, and during the period in which the rectangular wave in FIG. 4A exhibits the reference potential, the rectangular wave in FIG. 4B is −V1, and consequently, the +V1 period and the −V1 period do not overlap. As a result, the transverse-direction voltage that occurs between the electro-optical elements corresponding to the segment electrodes S2, S4 and the electro-optical elements corresponding to the segment electrodes S5, S6 is V1, maximum, in absolute value. That is, it is possible to ensure that a high voltage is not applied between adjacent electro-optical elements.

Figure 5:
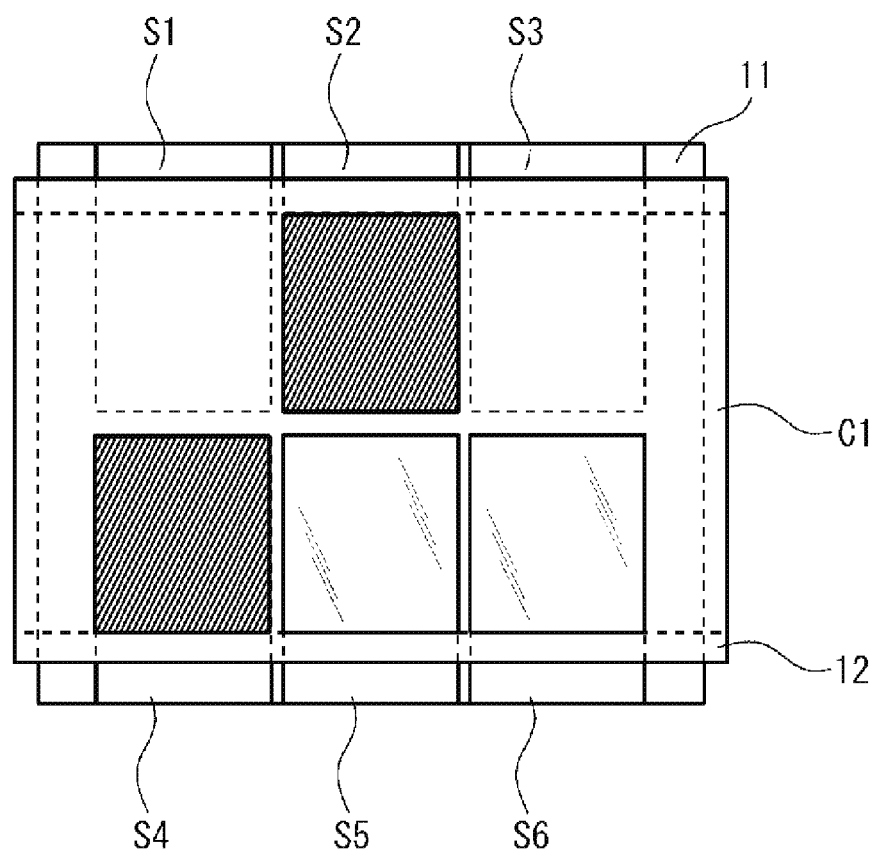
FIG. 5 is a diagram schematically illustrating a state of the outer appearance of the electro-optical device.

FIG. 5 is a diagram schematically illustrating a state of the outer appearance of the electro-optical device when driven by the driving waveform described above. An electro-deposition material is deposited on the depression and protrusion portion 15 of the surfaces of the segment electrodes S2, S4. As a result, the electro-optical elements corresponding to the segment electrodes S2, S4 are in a dark state (black state) in outer appearance. Further, an electro-deposition material is deposited on the flat surface of the common electrode C1 in the regions that face the segment electrodes S5, S6. As a result, the electro-optical elements corresponding to the segment electrodes S5, S6 are in a mirror surface state (reflective state) in outer appearance. Further, the electro-optical elements corresponding to the segment electrodes S1, S3 are not subjected to voltage application, and are therefore in a transparent state in outer appearance.

Note that, as a comparative example, in the electro-optical device of the embodiment described above, a reference potential was applied to the common electrode C1 and the segment electrodes S1, S3, a DC voltage of +2.8 V was applied to the segment electrodes S5, S6, a DC voltage of −2.8 V was applied to the segment electrodes S2, S4, and the outer appearance was observed. In this case, a voltage of 5.6 V in absolute value was applied between the segment electrode S4 and the segment electrode S5 as well as between the segment electrode S2 and the segment electrode S5, and malfunction between the electrodes was found. Specifically, a silver film was deposited on the side surfaces of the segment electrode S5 (the segment electrode S2 side and the segment electrode S4 side). Furthermore, after about 0.5 seconds, a crack occurred in the silver film formed on the side surfaces, resulting in linear peeling. Furthermore, when voltage was applied for a long period of time (1 second or longer, for example), the organic solvent was damaged and, due to the effects of this damage, air bubbles occurred, damaging the electro-optical elements to a state that could not be reverted. That is, it was found that normal operation could not be expected using the driving method in the comparative example.

FIGS. 6A and 6B are waveform drawings for explaining the driving method of the electro-optical device. In this embodiment, while the concept is basically the same as that of the embodiment illustrated in FIGS. 4A and 4B described above, by making the driving device 20 apply a pulse drive to adjacent electro-optical elements and not apply high-voltage pulses (step voltages) with different polarities simultaneously, a high voltage is not applied between adjacent electro-optical elements.

The driving voltage shown in FIG. 6A repeats a change in voltage a predetermined number of times n1 between +V1 during a period T1 and +V3, which is relatively lower than +V1, during a next period +V2, and subsequently repeats a change in voltage a predetermined number of times n2 between +V2, which is lower than +V1 and higher than +V3, during a period T3 and +V3 during a next period T4. The driving voltage shown in FIG. 6B repeats a change in voltage a predetermined number of times n1' between −V1 during a period T1' and −V3, which is relatively lower than +V1, during a next period T2', and subsequently repeats a change in voltage a predetermined number of times n2' between −V2, which is higher than −V1 and lower than −V3, during a period T3' and −V3 during a next period T4'. Then, the cycle of each of the driving voltages is set so that the period T1 and a period T1' do not overlap during the same time period, and the period T3 and a period T3' do not overlap during the same time period.

With these driving voltages, the period of the first half in which the voltage of ±V1 having a relatively large absolute value is applied is mainly a waveform for changing the mirror surface state or the black state to a desired state at a relatively high speed, and the period of the second half in which the voltage of ±V2 having a relatively small absolute value is applied is mainly a waveform for retaining (maintaining) the mirror surface state or the black state in the optical state as is. When the electrodes that receive the driving voltages shown in FIGS. 6A and 6B are each one of the segment electrodes S1 to S6, and the electrode that receives the reference voltage is the common electrode C1, the electro-optical element corresponding to the segment electrode that received the driving voltage shown in FIG. 6A becomes a black state in outer appearance, and the electro-optical element corresponding to the segment electrode that received the driving voltage shown in FIG. 6B becomes a mirror surface state in outer appearance. At this time, the period T1 and the period T1' of each of the driving voltages do not overlap in the same time period, and the period. T3 and the period T3' do not overlap in the same time period, making it possible to simultaneously achieve a black state and a mirror surface state without causing defects such as described above between adjacent electro-optical elements.

Note that, with these driving voltages, in a case where the voltage −V1 is applied n1 times and in a case where the voltage +V2 is applied n2 times, while the voltages applied in the periods T2, T4 were both +V3, the voltages may be different sizes. Also note that, in a case where the voltage −V1 is applied n1' times and in a case where the voltage −V2 is applied n2' times, while the voltages applied in the periods T2, T4 were both −V3, the voltages may be different sizes. Furthermore, with the driving voltages, while the absolute values were aligned as +V1 and −V1, and +V2 and −V2, the values may be different sizes.

As an example, a reference potential (0 V) was applied to the common electrode C1 and the segment electrodes S4, S6, the driving voltage of the waveform shown in FIG. 6A was applied to the segment electrodes S1 to S3, the driving voltage of the waveform shown in FIG. 6B was applied to the segment electrode S5, +V1 was set to +4 V, −V1 was set to −4 V, +V2 was set to +4 V, −V1 was set to −4 V, +V3 was set to +1.48 V, −V1 was set to −1.48 V, T1 and T1' were set to 3 ms, T2 and T2' were set to 220 ms, T3 and T3' were set to 0.1 ms, T4 and T4' were set to 220 ms, n1 was set to 30 times, and n2 was set to 0 to ∞. The operation state was then observed.

Figure 7:
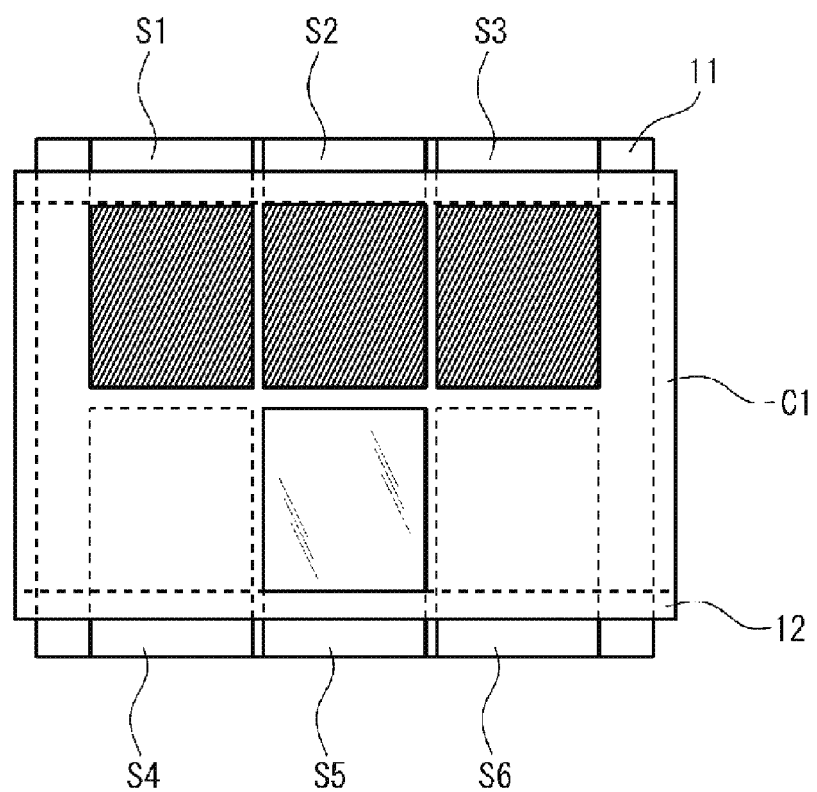
FIG. 7 is a diagram schematically illustrating a state of the outer appearance of the electro-optical device.

FIG. 7 is a diagram schematically illustrating a state of the outer appearance of the electro-optical device when driven by the driving waveform described above. As illustrated, the electro-optical elements corresponding to the segment electrodes S1 to S3 were in a black state in outer appearance, the electro-optical elements corresponding to the segment electrodes S4, S6 were in a transparent state in outer appearance, and the electro-optical element corresponding to the segment electrode S5 was in a mirror surface state in outer appearance. The areas between adjacent electro-optical elements, particularly the areas between each electro-optical element in a black state and the electro-optical element in a mirror surface state, were found to be free of defects such as malfunction and element damage.

The advantages achieved by the driving method of this embodiment include the following:

The driving method makes it possible to continuously maintain the same state in outer appearance for a long period of time.

The cancellation period (the period required for return to the transparent state) is constant regardless of the period of time that voltage is applied, and can be shortened.

The power consumed as a result of the driving voltage can be suppressed to a low value.

The driving method makes it possible to make the reflection spectrum flat and achieve a mirror surface state with high reflectance.

Note that the numerical values described above are merely examples and can vary according to conditions such as the electrolyte material, electrode surface area, and cell thickness. The values, however, are generally preferably set in ranges such as the following. Specifically, the period T1 is preferably set to from 400 µs to 5 ms, inclusive, and the voltage ±V1 at that time is preferably set to 10 V or less in absolute value, and more preferably 3 V or less (about 1.5 times the threshold value of the element). Note that V1 may be set to 10 V or greater as long as T1 and T1' are 1 ms or less. Further, preferably the periods T2, T2' are set to from 5 ms to 300 ms, inclusive, and the voltage ±V3 at that time is set to from 0.4 V to 2 V, inclusive, in absolute value. Further, the number of times n1, n1' that these pulse voltages are applied are preferably set as small as possible.

Further, preferably the periods T3, T3' are set to from 50 µs to 2 ms, inclusive, and the voltage +V2 at that time is set to from 2 V (a voltage slightly higher than the threshold value of the element) to 10 V, inclusive, in absolute value. Note that V2 may be set to 10 V or greater as long as T3, T3' are 0.1 ms or less. Further, preferably the periods T4, T4' are set to from 50 ms to 5 s, inclusive, and the voltage ±V3 at that time is set to from 0.4 V to 1.5 V, inclusive, in absolute value.

Further, the distance between electrodes is preferably large with respect to cell thickness. Here, this distance between electrodes is the distance between segment electrodes in the planar view in terms of the embodiment described above (refer to FIG. 2). Further, in a case where a plurality of common electrodes separated from each other is used, the distance between electrodes refers to the distance between these electrodes in the planar view. For example, when the cell thickness is 50 µm, stable operation can be achieved if the distance between electrodes is, for example, 100 µm or greater. Further, when the cell thickness is 15 µm, the distance between electrodes may be 30 µm or greater. In this way, the distance between electrodes is preferably at least twice the cell thickness.

According to the embodiments described above, it is possible to avoid applying a voltage higher than necessary between adjacent electro-optical elements, and thus prevent damage and malfunction in an electro-optical device in which a plurality of electro-optical elements that use an electrochromic material is configured side by side.

Note that this invention is not limited to the subject matter of the foregoing embodiments, and can be implemented by being variously modified within the scope of the gist of the present invention. For example, the quantities, shapes, and the like of the common electrode and the segment electrode in the embodiment described above are merely examples, and the quantities, shapes, and the like are not limited thereto. Further, while the depression and protrusion portion was provided on the surface of each of the segment electrodes in the embodiment described above, the depression and protrusion portion may be provided on the surface of the common electrode.

What is claimed is:

1. An electro-optical device comprising:
   a plurality of electro-optical elements provided between a first substrate and a second substrate, and
   a driving device that applies a driving voltage to each of the plurality of electro-optical elements;
   wherein:
   each of the plurality of electro-optical elements comprises a first electrode provided to the first substrate, a second electrode provided to the second substrate and facing the first electrode, and a electrolyte layer that contains an electro-deposition material and is disposed between the first electrode and the second electrode,
   the second electrodes of the plurality of electro-optical elements continuously form a common electrode extending across substantially an entire surface of the second substrate,
   the driving device selectively applies, to the first electrode of each of the plurality of electro-optical elements, one of (i) a first driving voltage of a positive polarity that cyclically repeats a first voltage and a second voltage that is lower than the first voltage, and (ii) a second driving voltage of a negative polarity that cyclically repeats a third voltage and a fourth voltage that has a lower absolute value than the third voltage and same absolute value as the second voltage,
   the driving device applies, to the second electrode of each of the plurality of electro-optical elements, a reference voltage whose value is equal to the second voltage and the fourth voltage, and
   when the driving device applies, respectively, the first driving voltage and the second driving voltage to a first electro-optical element and a second electro-optical element among the plurality of electro-optical elements, the second electro-optical element being adjacent to the first electro-optical element, a timing of applying the first driving voltage and a timing of applying the second driving voltage is offset such that a period of applying the first voltage to the first electro-optical element and a period of applying the third voltage to the second electro-optical element do not overlap.

2. The electro-optical device according to claim 1, wherein:
   a depression and protrusion portion is provided to a surface of one of the first electrode and the second electrode.

3. The electro-optical device according to claim 2, wherein:
   absolute values of the first voltage and the third voltage are equal.

4. The electro-optical device according to claim 3, wherein:
   a repetition frequency of the first voltage and the second voltage of the first driving voltage, and a repetition frequency of the third voltage and the fourth voltage of the second driving voltage are at least 50 Hz each.

5. The electro-optical device according to claim 4, wherein:
the electro-deposition material of the electrolyte layer contains silver.

6. The electro-optical device according to claim 3, wherein:
the electro-deposition material of the electrolyte layer contains silver.

7. The electro-optical device according to claim 2, wherein:
a repetition frequency of the first voltage and the second voltage of the first driving voltage, and a repetition frequency of the third voltage and the fourth voltage of the second driving voltage are at least 50 Hz each.

8. The electro-optical device according to claim 7, wherein:
the electro-deposition material of the electrolyte layer contains silver.

9. The electro-optical device according to claim 2, wherein:
the electro-deposition material of the electrolyte layer contains silver.

10. The electro-optical device according to claim 1, wherein:
absolute values of the first voltage and the third voltage are equal.

11. The electro-optical device according to claim 10, wherein:
a repetition frequency of the first voltage and the second voltage of the first driving voltage, and a repetition frequency of the third voltage and the fourth voltage of the second driving voltage are at least 50 Hz each.

12. The electro-optical device according to claim 11, wherein:
the electro-deposition material of the electrolyte layer contains silver.

13. The electro-optical device according to claim 10, wherein:
the electro-deposition material of the electrolyte layer contains silver.

14. The electro-optical device according to claim 1, wherein:
a repetition frequency of the first voltage and the second voltage of the first driving voltage, and a repetition frequency of the third voltage and the fourth voltage of the second driving voltage are at least 50 Hz each.

15. The electro-optical device according to claim 14, wherein:
the electro-deposition material of the electrolyte layer contains silver.

16. The electro-optical device according to claim 1, wherein:
the electro-deposition material of the electrolyte layer contains silver.

* * * * *